United States Patent
Poulsen et al.

(10) Patent No.: US 9,375,022 B2
(45) Date of Patent: Jun. 28, 2016

(54) FOOD PRODUCT HEAT TREATMENT APPARATUS AND METHOD FOR HEAT TREATING FOOD PRODUCTS

(75) Inventors: Ole Poulsen, Engesvang (DK); Wolfgang Schubert, Karup (DK)

(73) Assignee: SPX ADV DENMARK (DK)

( * ) Notice: Subject to any disclaimer, the term of this patent is extended or adjusted under 35 U.S.C. 154(b) by 332 days.

(21) Appl. No.: 13/322,919

(22) PCT Filed: May 28, 2010

(86) PCT No.: PCT/EP2010/003279
§ 371 (c)(1),
(2), (4) Date: Mar. 22, 2012

(87) PCT Pub. No.: WO2010/136217
PCT Pub. Date: Dec. 2, 2010

(65) Prior Publication Data
US 2012/0177796 A1  Jul. 12, 2012

(30) Foreign Application Priority Data
May 28, 2009 (EP) ..................... 09007154

(51) Int. Cl.
*A23C 3/02* (2006.01)
*A23C 3/03* (2006.01)
(Continued)

(52) U.S. Cl.
CPC .................. *A23C 3/031* (2013.01); *A23C 3/037* (2013.01); *A23C 3/0337* (2013.01); *A23L 3/001* (2013.01); *A23L 3/18* (2013.01)

(58) Field of Classification Search
CPC ....... A23C 11/00; A23C 3/037; A23L 1/0005
USPC .................... 99/453, 483; 426/521, 511, 522; 164/104.34
See application file for complete search history.

(56) References Cited

U.S. PATENT DOCUMENTS 4,559,963 A * 12/1985 Sugisawa .................. A23L 3/22 137/1
2007/0243299 A1* 10/2007 Keller et al. .................. 426/521

FOREIGN PATENT DOCUMENTS

CN 101420858 A 4/2009
CN 101535757 B 6/2011
(Continued)

OTHER PUBLICATIONS

Junker, B. et al., "A next generation, pilot-scale continuous sterilization system for fermentation media", Bioprocess Biosyt Eng., vol. 28, No. 6, pp. 351-378 (Feb. 18, 2006).
(Continued)

*Primary Examiner* — Phuong Nguyen
(74) *Attorney, Agent, or Firm* — Baker Hostetler LLP

(57) ABSTRACT

A food product heat treatment apparatus for heat-sensitive fluid food products, including an inlet for supplying the food product, an outlet for discharging the heat treated food product, a holding device downstream the inlet for holding the food product a specific time at a specific temperature, and a back pressure device downstream the holding device, wherein the holding device is a positive displacement holding device and/or a self cleaning holding device. A method for heat treating a heat-sensitive fluid food product, including supplying the food product to an inlet, heat treating the food product by holding the food product a specific time at a specific temperature in a holding device, providing a back pressure device downstream the holding device, and discharging the heat treated food product through an outlet, wherein the back pressure device includes a cooled valve and/or the food product is positively displaced through the holding device.

6 Claims, 2 Drawing Sheets

(51) Int. Cl.
 *A23C 3/033* (2006.01)
 *A23C 3/037* (2006.01)
 *A23L 3/00* (2006.01)
 *A23L 3/18* (2006.01)

(56) References Cited

FOREIGN PATENT DOCUMENTS

| | | |
|---|---|---|
| EP | 0221415 A1 | 5/1987 |
| EP | 0280810 A2 | 9/1988 |
| EP | 0794706 B1 | 9/1997 |
| JP | 63-216461 A | 9/1988 |
| JP | 1-151789 U | 10/1989 |
| JP | 2003-289838 A | 10/2003 |
| JP | 2008-121937 A | 5/2008 |
| JP | 2008121937 A * 5/2008 | ............ A23C 11/00 |
| WO | 99/21442 A1 | 5/1999 |

OTHER PUBLICATIONS

The Chinese First Office Action for Chinese Patent Application No. 201080030234.0.

Japanese Office Action Dated May 12, 2014.

* cited by examiner

FOOD PRODUCT HEAT TREATMENT APPARATUS AND METHOD FOR HEAT TREATING FOOD PRODUCTS

CROSS-REFERENCE TO RELATED APPLICATIONS

This application is a National Stage of International patent application PCT/EP2010/003279, filed on May 28, 2010, which claims priority to foreign European Patent Application No. EP 09007154.9, filed on May 28, 2009, the disclosures of each of which are incorporated by reference in their entireties.

FIELD OF THE DISCLOSED SUBJECT MATTER

The present invention relates to a food product heat treatment apparatus for heat treatment of heat-sensitive fluid food products, such as whey protein concentrate, baby food and cheese milk, and a method for heat treating heat-sensitive fluid food products.

BACKGROUND

A food product heat treatment apparatus in accordance with the preamble of claim 1 is known from EP 0 794 706 B1, wherein the whole contents thereof is incorporated into the present specification by reference.

With the known apparatus it is possible to provide a high temperature treatment of the food product for a short time in order to pasteurize the food product. However there may be slight fluctuations of the time the food product is heat treated. Therefore the holding time needs to be extended slightly in order to ensure a sufficient pasteurization.

SUMMARY

Accordingly it is an object of the present invention to provide a food product heat treatment apparatus for heat treatment of heat-sensitive fluid food products, such as whey protein concentrate, baby food and cheese milk, wherein the holding time can be minimized.

In accordance with embodiments of the invention there is provided a food product heat treatment apparatus for heat treatment of heat-sensitive fluid food products, such as whey protein concentrate, baby food and cheese milk, comprising an inlet for supplying the food product, an outlet for discharging the heat treated food product, a holding device downstream the inlet for holding the food product for a specific time at a specific temperature, and a back pressure device downstream the holding device, wherein the back pressure device is a cooled valve, and/or wherein the holding device is a positive displacement holding device and/or a timing device and/or a self cleaning holding device.

Since the invention is directed to a food product heat treatment apparatus the term cooled valve cannot be interpreted such that the valve is cooled by the heat treated food product passing the valve. On the contrary the term "cooled valve" is to be understood that the valve comprises means for externally cooling the valve. For instance a cooling fluid can be passed through cooling channels provided in the cooled valve. Other means for externally cooling the valve may be provided alternatively and/or in addition thereto. The same applies to other cooled devices the heat treated food product is passing through, i.e. such cooled devices are not cooled by the heat treated food product but by external cooling means. With other words, the cooled valve can also be designated as cooling valve or externally cooled valve. Similarly the cooled device can be designated as cooling device or externally cooled device.

Providing a back pressure device downstream the holding device has the advantage that a pressure drop across the holding device can be avoided or at least essentially be reduced because the pressure at the inlet of the holding device corresponds to the pressure at the outlet thereof. Therefore a slippage of food product through any small passages or gaps bypassing the normal way of travel through the holding device can essentially or almost completely or practically completely eliminated. The holding time of food product bypassing the normal way of travel would be less than the holding time for food product passing the normal way of travel. If there is a considerable amount of food product bypassing the normally way of travel, there would be the need of extending the holding time for all food product in order to ensure that all food product is heat treated sufficiently. Therefore the holding time can be minimized in accordance with the embodiments of the invention because of the absence of a pressure difference across the holding device.

Cooling the back pressure device is preferred in order to cool down the food product at the time the food product is leaving the holding device after having been heat treated for the intended short time. There is the advantage that the cooled product will result into less problems with coating and sticking of heat treated food material onto the inner surface of the back pressure device.

In accordance with the preferred embodiment the holding device is a lobe pump. Due to the positive displacement of the food product through the holding device the time the food product is heat treated in the holding device can be determined with a very high accuracy. In addition it is ensured that the complete food product needs to pass through the holding device because there is no bypass. Accordingly it is possible to minimize the holding time without the risk of an incomplete pasteurization.

In accordance with the invention the back pressure device can be a cooled back pressure device.

In accordance with the invention the cooled back pressure device can be any cooled device that generates a pressure drop, for instance a valve, a venturi tube, an orifice or equivalent means.

In accordance with the invention the holding device can be or comprise a lobe pump and/or a positive pump and/or a positive displacement pump.

In accordance with the invention the holding device can be or comprise a pipe.

In accordance with the invention the holding device can be or comprise a heat exchanger.

In accordance with the invention the heat exchanger can be a scraped surface heat exchanger, which can be or comprise a tubular heat exchanger. Alternatively the heat exchanger can have other shapes.

In accordance with the invention the holding device can be or comprise a screw transport pump.

In accordance with the invention the screw transport pump can be an extruder or equivalent means.

In accordance with the invention the back pressure device can be or comprise a valve.

In accordance with the invention the valve can be a back pressure valve.

In accordance with the invention the back pressure device can be or comprise a cooled valve.

In accordance with the invention the housing of the valve can be cooled and/or the valve cone can be cooled and/or the shaft of the valve can be cooled and/or the seat of the valve can be cooled.

In accordance with the invention the valve can be a back pressure valve.

In accordance with the invention the back pressure device can be or comprise a displacement pump device.

In accordance with the invention the back pressure device can be a positive displacement pump, for instance a gear pump. In accordance with the invention the housing of the pump may be cooled.

In accordance with the invention the back pressure device can be directly downstream of the holding device and/or can be integrated in the holding device at the outlet of the holding device.

In accordance with the invention a connection or pipe can be provided between the holding device and the back pressure device.

In accordance with the invention the food product heat treatment apparatus can further comprise an infusion heating device upstream of the holding device.

In accordance with the invention it may be possible to integrate an infusion heating device into the holding device, preferably at the inlet thereof.

According to a preferred embodiment there is disclosed a back pressure device comprising a lobe pump having an integrated cooled valve at its outlet.

In accordance with the invention there is provided a method for heat treating a heat-sensitive fluid food product, such as whey protein concentrate, baby food and cheese milk, comprising the following steps:

(a) supplying the food product to an inlet (21),
(b) heat treating the food product by holding the food product for a specific time at a specific temperature in a holding device,
(c) providing a back pressure device downstream the holding device, and
(d) discharging the heat treated food product through an outlet (22), wherein the back pressure device is or comprises a cooled valve and/or the food product is positively displaced through the holding device.

The method of the invention has the advantage that a pressure drop in the holding device is essentially eliminated. Accordingly the holding time in the holding device can be minimized.

In accordance with the invention the back pressure device can be cooled. This has the advantage that sticking of processed food material at the inner surfaces can be further eliminated and preferably be avoided.

In accordance with the invention steam can be injected into the food product before and/or at the time of supplying the food product into holding device.

In accordance with the invention the method can be preformed with an apparatus in accordance with the invention as mentioned above.

BRIEF DESCRIPTION OF THE DRAWINGS

The invention will be explained in further detail with reference to the drawings, wherein the following reference numbers are used:
21 food product inlet
22 food product outlet
23 holding device
24 back pressure device
25 cooling device
26 cooling medium inlet
27 cooling medium outlet
28 process flow direction
29 connection means
30 infusion heating device Preferred embodiments of the invention are shown in the attached drawings.

DETAILED DESCRIPTION

Figure 1:
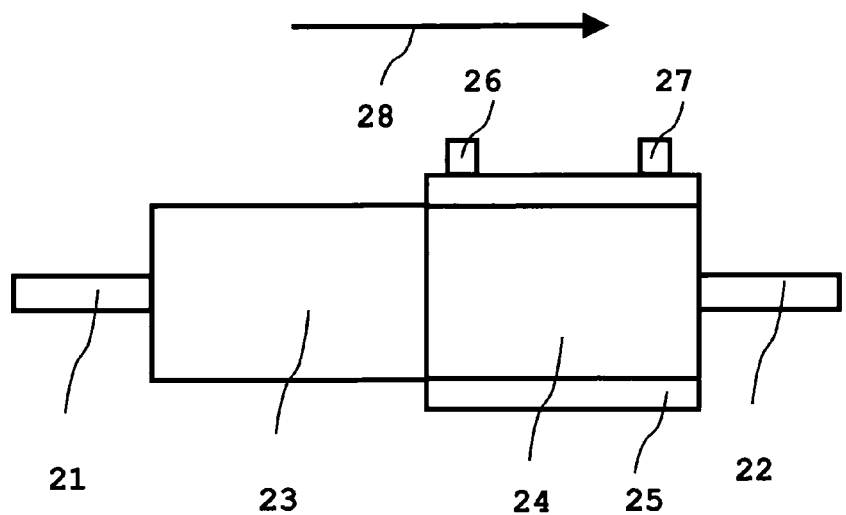
FIG. 1 is a schematic diagram of a food product heat treatment apparatus in accordance with an embodiment of the invention.

FIG. 1 shows a schematic diagram of a food product heat treatment apparatus for heat treatment of heat-sensitive fluid food products, such as whey protein concentrate, baby food and cheese milk, in accordance with a first embodiment of the invention.

The food product heat treatment apparatus comprises a food product inlet 21 for supplying the food product into the food product heat treatment apparatus, a food product outlet 22 for discharging the heat treated food product, a holding device 23 downstream the food product inlet 21 for holding the food product for a specific time at a specific temperature, and a back pressure device 24 located downstream the holding device 23.

A cooling device 25 is provided to cool the back pressure device 24 such that a burning and scaling up of the heat treated food product is reduced and preferably avoided. The cooling device comprises a cooling medium inlet 26 and a cooling medium outlet 27.

The arrow at top of the Figures indicates the process flow direction 28.

The holding device 23 is a positive displacement holding device and/or a timing device and/or a self cleaning holding device.

Preferably the holding device is a lobe pump. The holding device 23 can also be or comprise a positive pump, a positive displacement pump of any kind known to the skilled person. The holding device 23 can also be or comprise a pipe. The holding device can be or comprise a heat exchanger to maintain a constant heat treating temperature in the holding device 23. The holding device can also be or comprise a screw transport pump like an extruder. According to the invention any holding device can be used which provides a specific holding time of the food product in the holding device.

Preferably the back pressure device 24 is a cooled valve. The cooling the valve can be provided as a cooling on the valve housing and/or on the valve cone and/or on the valve shaft. Such cooled valves are known to the skilled person and its integration into for instance a lobe is within the skill and knowledge of the skilled person.

According to the invention the back pressure device 24 can be any preferably cooled device that generates a pressure drop across the back pressure device such that a pressure drop across the holding device can be avoided and/or at least essentially reduced. For instance the back pressure device can be a valve, a venturi tube, an orifice or similar means like a tube having a section with a reduced diameter. The back pressure device 24 can also be or comprise a positive displacement pump.

According to the preferred embodiment the back pressure device 24 is integrated in the holding device 23 at the outlet thereof. Preferably the holding device 24 is a lobe pump and the back pressure device 24 is preferably a cooled valve.

Figure 2:
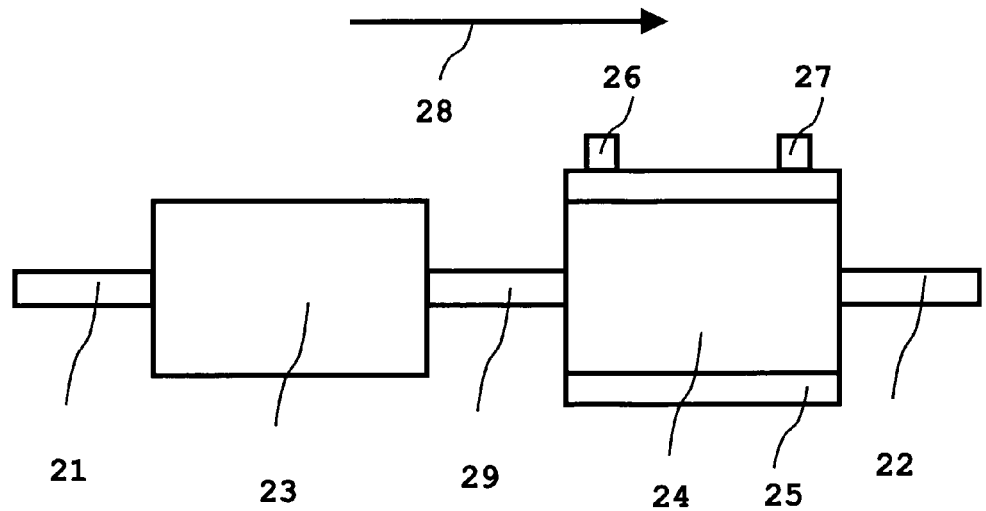
FIG. 2 is a schematic diagram of a food product heat treatment apparatus in accordance with another embodiment of the invention.
Figure 3:
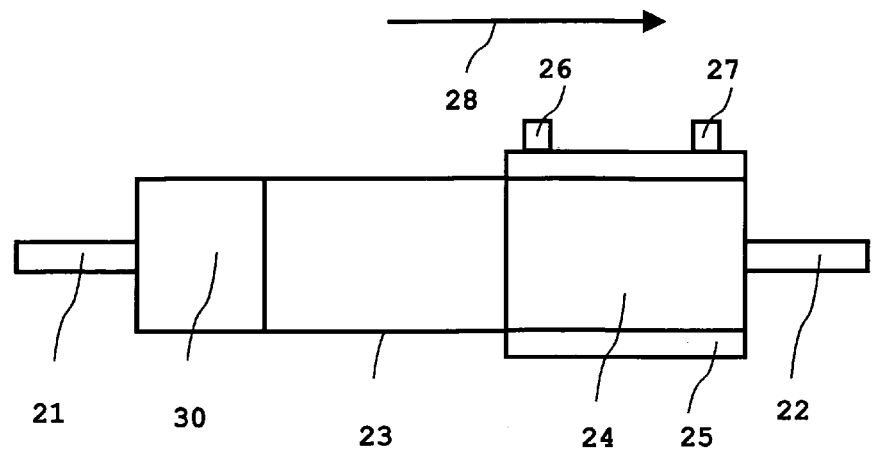
FIG. 3 is a schematic diagram of a food product heat treatment apparatus in accordance with another embodiment of the invention.
Figure 4:
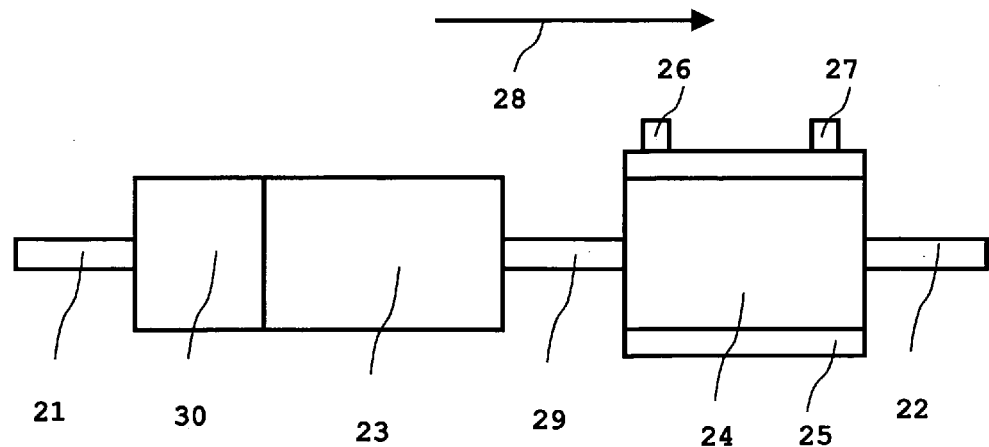
FIG. 4 is a schematic diagram of a food product heat treatment apparatus in accordance with another embodiment of the invention.

FIGS. 2 to 4 show schematic diagrams of alternative embodiments of the invention. Same or similar parts are designated with the same reference numerals. Reference is made to the description of the embodiments of FIG. 1. In the following only the differences to the embodiments of FIG. 1 are described.

In the embodiments according to the schematic diagram of FIG. 2 the back pressure device 24 is not integrated into the holding device or immediately following the holding device but connected by connection means 29.

In the embodiments according to the schematic diagram of FIG. 3, an instant infusion device is provided at the holding device 23. In the instant infusion device hot steam is injected into the food product in order to instantaneously heating up the food product to the desired temperature the food product is to be held in the holding device for a specific time. The embodiments according to the schematic diagram of FIG. 4 corresponds to the combination of the embodiments of FIG. 2 and FIG. 3, i.e. there are provided connection means 29 and the instant infusion heating device 30.

Any other heating means for heating up the food product can be used. For instance a heat exchanger can be used to heat the housing of the holding device.

The invention claimed is:

1. A food product heat treatment apparatus that performs heat treatment of heat-sensitive fluid food products, such as whey protein concentrate, baby food and cheese milk, the food product heat treatment apparatus comprising:
an inlet;
an outlet;
a heat infusion device in fluid communication with the inlet;
a lobe pump provided downstream of the heat infusion device and in fluid communication with at least the heat infusion device and the inlet;
a back pressure device provided downstream of at least a portion of the lobe pump and in fluid communication with at least the lobe pump and the outlet, and
a cooling device attached to the back pressure device,
wherein the inlet receives the heat-sensitive fluid food products and the heat infusion device heats the heat-sensitive fluid flood products upstream of the lobe pump,
wherein the lobe pump receives the heat-sensitive fluid food products from the heat infusion device, the lobe pump operates, and the lobe pump holds the heat-sensitive fluid food products for a time corresponding to an operation of the lobe pump,
wherein the operation of the lobe pump includes the lobe pump moving the heat-sensitive fluid food products to the back pressure device and thereby cleaning the heat-sensitive fluid food products from the lobe pump,
wherein the lobe pump comprises a heat exchanger, and
wherein the back pressure device comprises a displacement pump device.

2. The food product heat treatment apparatus according to claim 1, wherein the cooling device includes:
a cooling medium inlet,
a cooling medium outlet, and
a fluid passage in fluid communication with the cooling medium inlet and the cooling medium outlet, and
wherein the fluid passages surrounds the back pressure device and the back pressure device is cooled by a cooling medium in the fluid passage.

3. The food product heat treatment apparatus according to claim 1, further comprising a connection means in fluid communication with the lobe pump and the back pressure device downstream of the lobe pump and upstream of the back pressure device.

4. The food product heat treatment apparatus according to claim 1, wherein the back pressure device comprises a valve.

5. The food product heat treatment apparatus according to claim 1, wherein the cooling device includes a fluid passage, wherein the back pressure device comprises a valve, and
wherein the fluid passage is positioned relative to the valve such that the cooling device and the valve provide a cooled valve.

6. The food product heat treatment apparatus according to claim 1, wherein the back pressure device is integrated into an outlet of the lobe pump.

\* \* \* \* \*